United States Patent
Malitzis

(10) Patent No.: US 7,587,346 B2
(45) Date of Patent: Sep. 8, 2009

(54) AUTOMATED MARKET SYSTEM WITH SELECTABLE MATCH-OFF OF ORDER FLOW

(75) Inventor: John F. Malitzis, Washington, DC (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 1557 days.

(21) Appl. No.: 10/040,912

(22) Filed: Jan. 7, 2002

(65) Prior Publication Data
US 2003/0130925 A1 Jul. 10, 2003

(51) Int. Cl.
G06Q 40/00 (2006.01)
(52) U.S. Cl. .............................. 705/35; 705/36; 705/37
(58) Field of Classification Search .................... 705/35
See application file for complete search history.

(56) References Cited

U.S. PATENT DOCUMENTS

| | | | | |
|---|---|---|---|---|
| 4,412,287 | A * | 10/1983 | Braddock, III | 705/37 |
| 4,674,044 | A * | 6/1987 | Kalmus et al. | 705/37 |
| 5,077,665 | A * | 12/1991 | Silverman et al. | 705/37 |
| 5,136,501 | A * | 8/1992 | Silverman et al. | 705/37 |
| 5,297,032 | A * | 3/1994 | Trojan et al. | 705/37 |
| 5,727,165 | A * | 3/1998 | Ordish et al. | 705/37 |
| 6,014,643 | A * | 1/2000 | Minton | 705/36 R |
| 6,195,647 | B1 * | 2/2001 | Martyn et al. | 705/36 R |
| 6,278,982 | B1 * | 8/2001 | Korhammer et al. | 705/36 R |
| 6,532,460 | B1 * | 3/2003 | Amanat et al. | 705/36 R |
| 6,618,707 | B1 * | 9/2003 | Gary | 705/36 R |
| 6,829,589 | B1 * | 12/2004 | Saliba | 705/36 R |
| 6,882,985 | B1 * | 4/2005 | Kay et al. | 705/37 |
| 7,020,630 | B2 * | 3/2006 | Russell et al. | 705/36 R |
| 7,035,819 | B1 * | 4/2006 | Gianakouros et al. | 705/37 |
| 7,130,824 | B1 * | 10/2006 | Amanat et al. | 705/37 |
| 7,181,424 | B1 * | 2/2007 | Ketchum et al. | 705/37 |
| 7,209,896 | B1 * | 4/2007 | Serkin et al. | 705/37 |
| 7,472,087 | B2 * | 12/2008 | Keith | 705/37 |
| 2001/0039527 | A1 * | 11/2001 | Ordish et al. | 705/37 |
| 2001/0042040 | A1 * | 11/2001 | Keith | 705/37 |
| 2001/0044770 | A1 * | 11/2001 | Keith | 705/37 |
| 2001/0051909 | A1 * | 12/2001 | Keith | 705/37 |
| 2002/0073016 | A1 * | 6/2002 | Furbush et al. | 705/37 |

(Continued)

OTHER PUBLICATIONS

"Market Fragmentation," by Hans R. Stoll. Financial Markets Research Center. Policy Paper No. 00-11. Vanderbilt University. Apr. 28, 2000. Current Version: Sep. 5, 2000.*

(Continued)

Primary Examiner—Jagdish N Patel
Assistant Examiner—Sara Chandler
(74) Attorney, Agent, or Firm—Fish & Richardson P.C.

(57) ABSTRACT

An electronic market for trading of securities includes a plurality of client stations for entering quotes for securities and a server process that receives quotes from the clients, aggregates the quotes and causes a total of all aggregated quotes to be displayed for a plurality of price levels on the client systems. The market uses a graphical user that depicts aggregated quotes in an aggregate window a plurality of price levels of a product traded in the market. The market also includes processes to handle lock/cross market conditions, match-off of order flow and provides a central quote/order collector that interfaces to disparate order delivery systems to minimize dual liability of market makers.

17 Claims, 14 Drawing Sheets

U.S. PATENT DOCUMENTS

| | | | |
|---|---|---|---|
| 2002/0082967 A1* | 6/2002 | Kaminsky et al. ............. | 705/37 |
| 2002/0091617 A1* | 7/2002 | Keith ........................... | 705/37 |
| 2002/0095364 A1* | 7/2002 | Russell et al. ................. | 705/37 |
| 2002/0103732 A1* | 8/2002 | Bundy et al. .................. | 705/35 |
| 2002/0133454 A1* | 9/2002 | Malitzis et al. ............... | 705/37 |
| 2002/0138390 A1* | 9/2002 | May ............................. | 705/37 |
| 2002/0138401 A1* | 9/2002 | Allen et al. ................... | 705/37 |
| 2002/0152152 A1* | 10/2002 | Abdelnur et al. .............. | 705/37 |
| 2002/0156716 A1* | 10/2002 | Adatia ......................... | 705/37 |
| 2002/0161687 A1* | 10/2002 | Serkin et al. .................. | 705/37 |
| 2003/0004858 A1* | 1/2003 | Schmitz et al. ............... | 705/37 |
| 2003/0009412 A1* | 1/2003 | Furbush et al. ................ | 705/37 |
| 2003/0009413 A1* | 1/2003 | Furbush et al. ................ | 705/37 |
| 2003/0009414 A1* | 1/2003 | Furbush et al. ................ | 705/37 |
| 2003/0065598 A1* | 4/2003 | Bunda .......................... | 705/36 |
| 2003/0093343 A1* | 5/2003 | Huttenlocher et al. ......... | 705/35 |
| 2003/0093359 A1* | 5/2003 | Martyn et al. ................. | 705/37 |
| 2003/0149652 A1* | 8/2003 | Pham ........................... | 705/37 |
| 2003/0154152 A1* | 8/2003 | Gilbert et al. ................. | 705/37 |

OTHER PUBLICATIONS

"Price-Time Priority, Order Routing, and Trade Execution Costs in NYSE-listed Stocks," by Hendrik Bessembinder. Goizueta Business School, Emory University. Initial Draft: Nov. 2000.*

"The Legal Basis for Stock Exchanges: The Classification and Regulation of Automated Trading Systems,: by Ian Domowitz. Departmenf of Finance-Smeal College of Business Administration, Pennsylvania State University. Mar. 1998.*

"The Allocation of Investors' Orders and Inefficient Market Competition: A Proposal," by Allen Ferrell. Discussion Paper No. 281. The Center for Law, Economics, and Business. Harvard Law School. Apr. 2000.*

"Competition and Collusion in Dealer Markets," by Prajit K. Dutta; Ananth Madhavan. The Journal of Finance, vol. 52, No. 1. (Mar. 1997), pp. 245-276).*

"A Proposal for Solving the 'Payment for Order Flow' Problem," by Allen Ferrell. Published in 74 S.Cal.L.Rev. 1027 (2001).*

"The Law and Economics of Best Execution," by Jonathan R. Macey and Maureen O'Hara. Cornell University, Ithaca, New York 14853. Received Oct. 7, 1996.*

"What glory price?," by Erik R. Sirri. Babson College. Federal Reserve Bank of Atlanta- 2000 Financial Conference on e-Finance. Sea Island, Georgia. Oct. 15-17, 2000.*

"Payment for Order Flow, Trading Costs, and Dealer Revenue for Market Orders at Knight Securities, L.P.", by Robert Battalio et.al. First Draft: May 1998. Current Draft: Dec. 1998.*

"The Internet and the Future of Financial Markets," by Ming Fan et.al. Communications of the ACM. vol. 43, No. 11. Nov. 2000.*

* cited by examiner

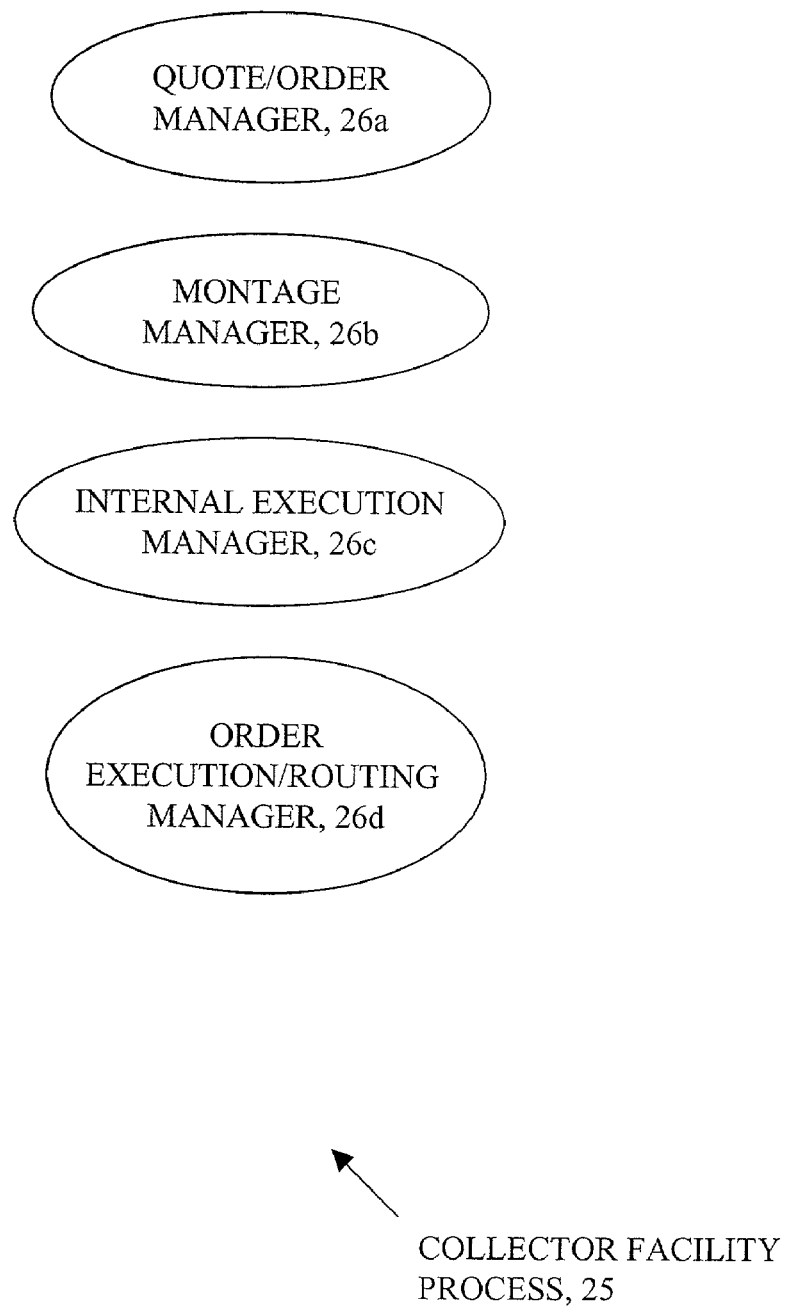

AUTOMATED MARKET SYSTEM WITH SELECTABLE MATCH-OFF OF ORDER FLOW

BACKGROUND

This invention relates to trading systems particularly financial trading systems.

Electronic equity markets, such as The Nasdaq Stock Market® collect, aggregate and display pre-trade information to market participants. In The Nasdaq Stock Market, for example, this pre-trade information takes the form of a quote that represents a single or an aggregate of same-priced principal or agency orders. A market such as Nasdaq also provides trading platforms through which market participants may access liquidity indicated in the marketplace.

SUMMARY

According to an aspect of the present invention, a method of processing an order in a market system includes receiving an order from a market participant and for the order, checking if a market participant has qualified the order for avoidance of an internalization execution process for the order in the market system.

According to an additional aspect of the present invention, a market system includes an order execution process that receives orders and matches orders against quotes posted in the system on a time priority basis. The system also includes an internalization execution process that checks if a market participant identification associated with a received order matches a market participant identification representing a quote in the system that is at the best bid or best offer price in the system and an order entry process that checks if the market participant has qualified the order for avoidance of the internalization execution process for the order in the market system.

According to an additional aspect of the present invention, a computer program product for operating a market system comprises instructions for causing a computer to receive an order from a market participant customer and for the order, check if a market participant has qualified the order for avoidance of an internalization execution process in the market system.

One or more of the following advantages may be provided by one or more aspects of the present invention.

The invention features a new type of order qualifier, an anti-internalization qualifier for an order. This order qualifier permits non directed orders and preferenced orders different options for order processing.

The market system features an internal order execution manager. The internal order execution manager tries to match-off a quoting market participant's customer orders against orders and/or quotes that are in the system if the market participant is at the BBO and receives a market or marketable limit order on the other side of the market. This encourages market participants to give their book of quotes to the market so that their customers can get the best price and best size of execution while insuring quoting market participants that the market will match-off the order flow in their book if the market participant is at the best price. The order qualifier permits selective innovation of the internal order execution manager.

BRIEF DESCRIPTION OF THE DRAWINGS

FIG. 2B is a logic view of functions in the quote/order collector facility.

DESCRIPTION

Figure 1:
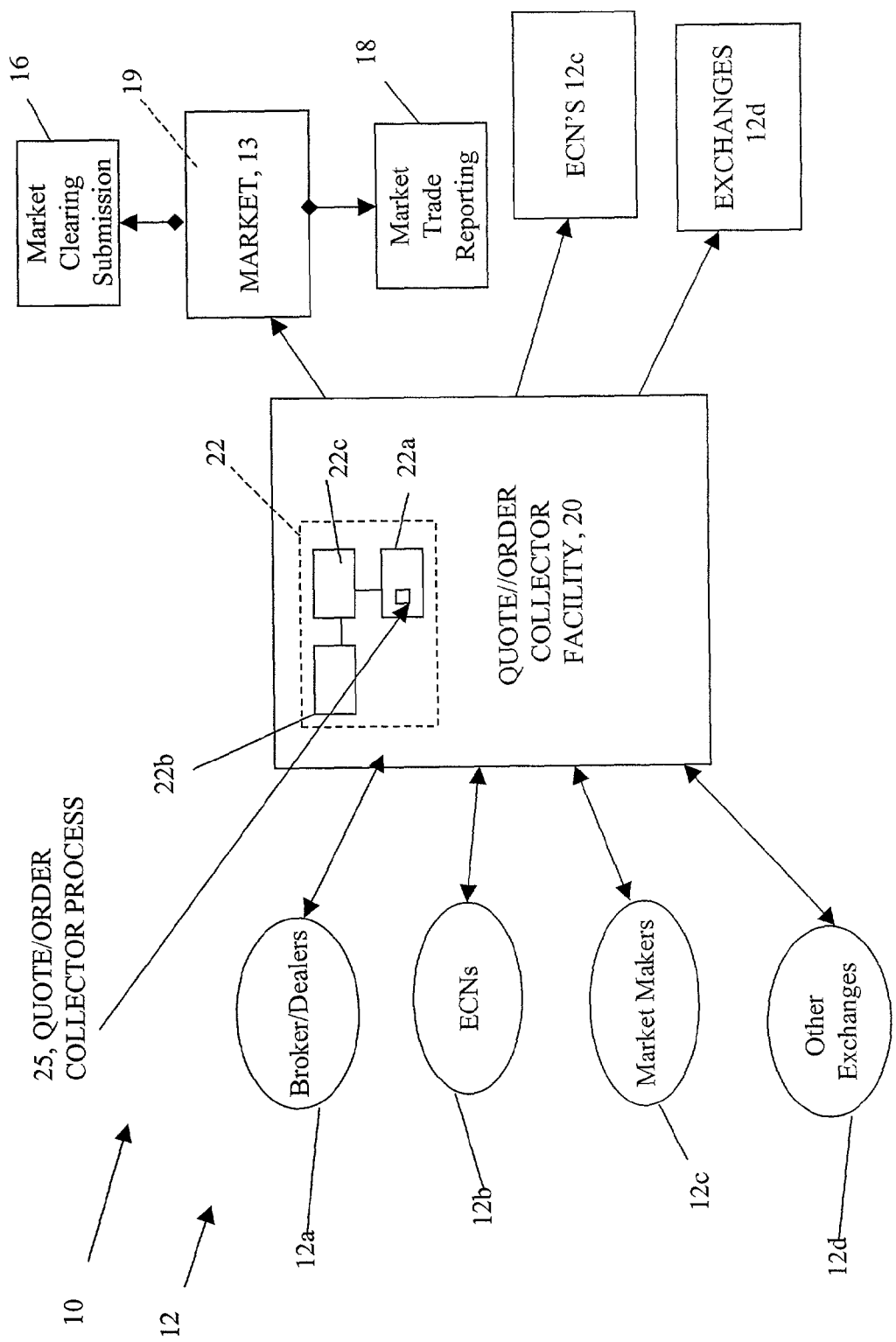
FIG. 1 is a block diagram of a market system.

Referring to FIG. 1, an electronic market 10 is shown. The electronic market 10 includes client systems 12 that access a central quote/order collector facility 20. The client systems 12 can be broker/dealer systems 12a, electronic communication networks (ECN's) 12b, market-marker systems 12c, and other exchanges 12d. The connections can use existing Nasdaq protocols such as SelectNet®, Small Order Execution System$^{SM}$ (SOES$^{SM}$), and so forth. The client systems 12 include a processor, memory and a storage device, e.g., a client workstation or personal computer (all not shown) that can include a client process to enter quotes/orders into the electronic market system 10. The quote/order collector facility 20 causes the order execution or order delivery systems (e.g., SOES$^{SM}$ and SelectNet®) to deliver executions or orders to a market that is coupled to a clearing system 16 and a reporting system 18. It also causes delivery of executions or routing of orders to the ECN's 12c, depending on the status of the ECN, and routing of orders to other markets and exchanges 12d. The quote/order collector facility 20 includes one or preferably a plurality of server computers generally denoted as 22 including a processor 22a, main memory 22b and storage 22c. The storage system 22c includes quote/order collector process 25 that is executed in memory 22b. In general, server 22 is a complex computer server, the details of which are not important to an understanding of the present invention.

The quote/order collector facility 25 collects pre-trade information in the form of quotes or orders. The distinction between a quote and an order depends on several factors. For example, each market maker can send a proprietary quote, i.e., a quote that represents its own trading interest, or an agency quote that represents trading interest of a sponsored entity. If one proprietary quote is sent, it could be considered one order. If one agency quote is sent it also could be considered one order. If an agency quote reflects an aggregation of more than one agency order, however, the aggregate agency order could be considered a quote. Entering quotes are limited to registered market makers 12b and ECNs 12c and possible UTP Exchanges 12d. For any given stock, a registered market maker or ECN may directly enter a non-marketable order, i.e., quote into the system 20 on behalf of its customer account, or it may sponsor the direct entry of an order by its customer. All sponsored quotes are sent to the quote/order collector facility 20 under the name of the sponsoring market maker or ECN. Every registered market maker or ECN can submit an unlimited number of non-marketable quotes to the system 20.

Figure 1A:
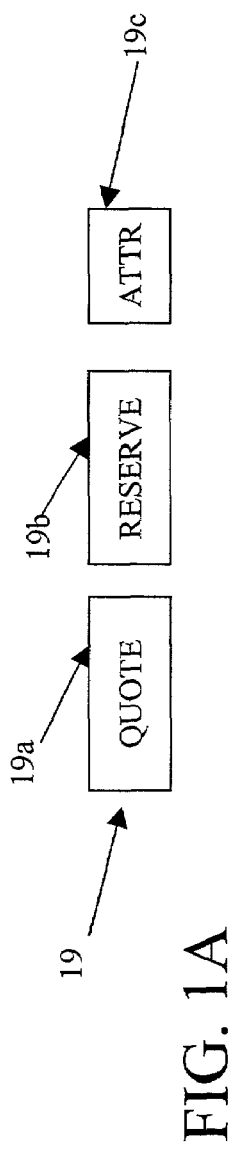
FIG. 1A is a diagram showing a format for quotes.

As shown in FIG. 1A, each quote 19 submitted to the electronic market system 10 can include a displayed quote size 19a, a reserve size 19b and an indication 19c (ATTR) of whether the quote size is attributable or non-attributable. Quote size 19a, when attributable based on indicator 19c, is directly attributable to the market maker or ECN and is displayed in a "current quote" montage (not shown). Quote size 19a when non-attributable is the size that the market maker or ECN wishes to display to the marketplace through an aggregate montage of the order display window. This quote size 19a is not attributable to the market maker or ECN until it is executed. Reserve size 19b is the size that is not displayed to the marketplace but that is immediately accessible through the quote/order collector facility 20. In order to use reserve size 19b, a market maker can be required to have a minimum amount displayed in the aggregate quote size 19a without attributable indicator 19c.

A broker/dealer can receive an order from a customer. The broker/dealer can send that order to the order collector facility 20 to be executed with quotes that are posted by electronic communication networks, market makers or other markets.

Figure 1B:
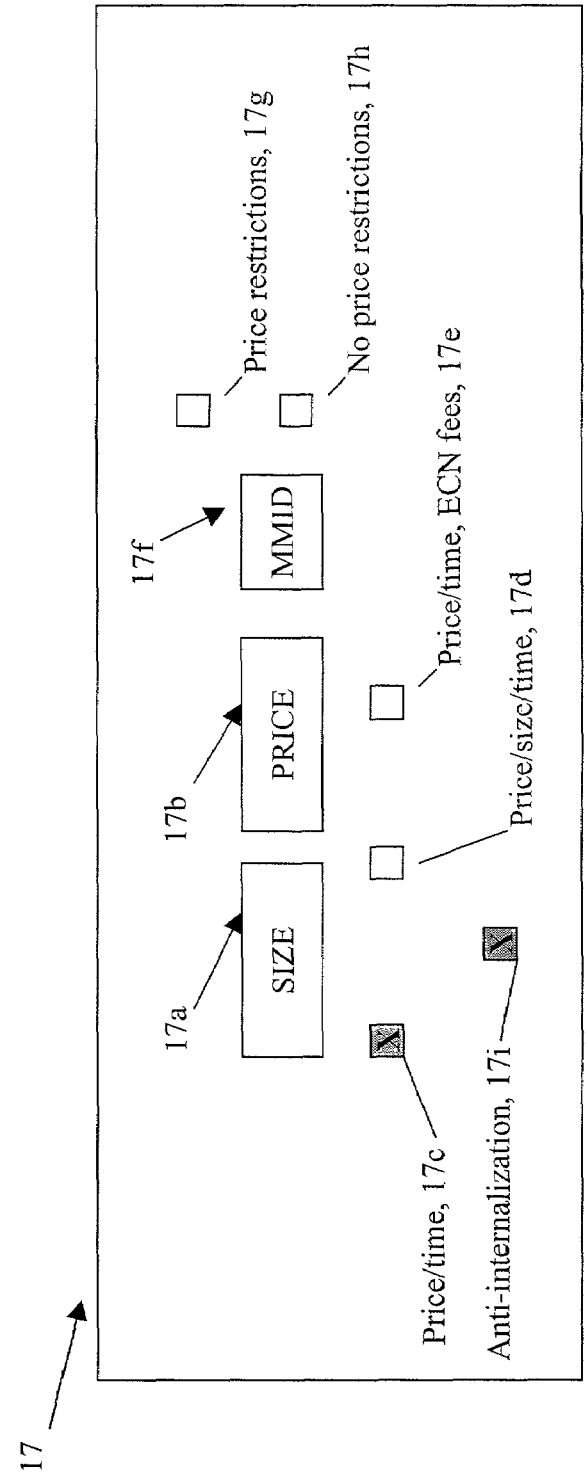
FIG. 1B, a diagram depicting an entry screen for non-directed orders or preferenced orders.

Referring to FIG. 1B, an entry screen 17 for non-directed order entry is shown. The screen 17 allows a participant to enter non-directed orders and would generally include fields 17a-17e for entering information including price, amount, and also three type fields. The type fields 17c-17e determine how the order interacts in the execution/routing manager 26d against Quoting Market Participant's contra-side quotes/orders. The type fields choose a priority, e.g., price/time box 17c; or price/size/time box 17d; or price/time that accounts for ECN access fees box 17e.

The screen 17 can also have a field 17f to enter a quoting market participant's symbol for the purpose of entering preferenced orders. Optionally, the screen 17 can have fields 17g, 17h to indicate a preference order type, e.g., a preferenced order that has price restrictions box 17g or a preferenced order that does not have price restrictions box 17h. Alternatively, the electronic market system 10 can be configured to accept only one type of preferenced order and not the other.

The screen can have a field 17i to specify an anti-internalization qualifier property of the order. The anti-internalization qualifier property operates with the execution/matching algorithm for non-directed orders to influence how the orders interact with interest that exists in the system.

Order Collector Facility

Figure 2A:
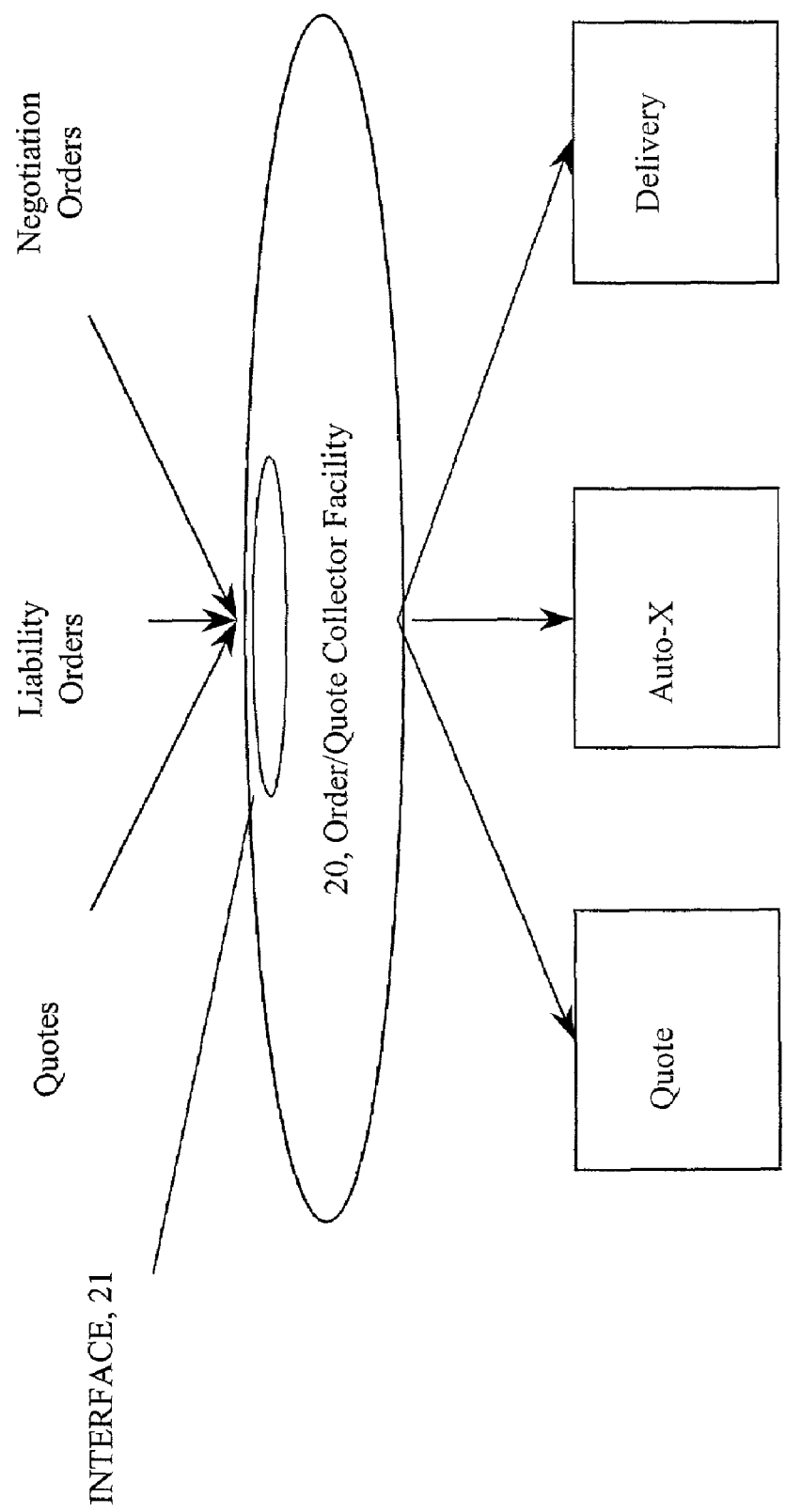
FIG. 2A is a block diagram showing arrangement of a quote/order collector facility.

Referring to FIG. 2A, the quote/order collector facility 20 receives quotes, orders, from market participants. The quote/order collector facility 20 allows a quote/order to be displayed in the market, and also allows for marketable orders to be executed or routed to market participants.

The order quote collector facility 20 also includes an interface 21 that couples the order collector facility 20 to a plurality of order delivery systems. The interface 21 would provide access to information contained in order flow delivered via the delivery systems to a quote/order collection process 25 described in conjunction with FIG. 2B. In general, the electrical and logical functions which comprise the interface 21 can be similar to the ones currently existing in the SOES$^{SM}$/SelectNet® systems. The interface 21 or the process 25 would extract information from the quotes and make that information available to the quote order collector process 25.

The interface 21 can also be used to route executions of liability orders back to market participants whose quotes/orders were executed against and can deliver orders, both liability orders for execution or non-liability orders for negotiation against market participants whose quotes are selected for further negotiation via the SelectNet® systems.

Referring to FIG. 2B, the quote/order collector process 25 is shown. The quote/order collector process 25 provides transmission of multiple orders or quotes at multiple price levels by Quoting Market Participants to a quotation manager 26a. The quote/order manager 26a provides a unified point of entry of quotes and orders from disparate delivery systems into the quote/order collector facility 20 to access quotes/orders displayed (as either attributable or non-attributable) in both the aggregate montage and current quote montage. The quote/order manager 26a manages multiple quotes/orders and quotes/orders at multiple price levels and uses a montage manager 26b to display (either in the aggregate montage or in the current quote montage) the orders/quotes consistent with an order's/quote's parameters. The order collector process 25 also includes an internal execution process manager 26c to match off executions for quoting market participants at the best bid/offer. The order collector system 20 also includes an order routing/execution manager 26d providing a single point delivery of executions or routing of orders, which substantially eliminates potential for dual liability. That is, order collector process 25 can maintain the order routing and executions functionality available in the SOES$^{SM}$ and SelectNet® systems. The order collector process 25 also can include a quote update manager, a lock/cross quote manager, and an odd lot execution manager (all not shown).

Figure 3A:
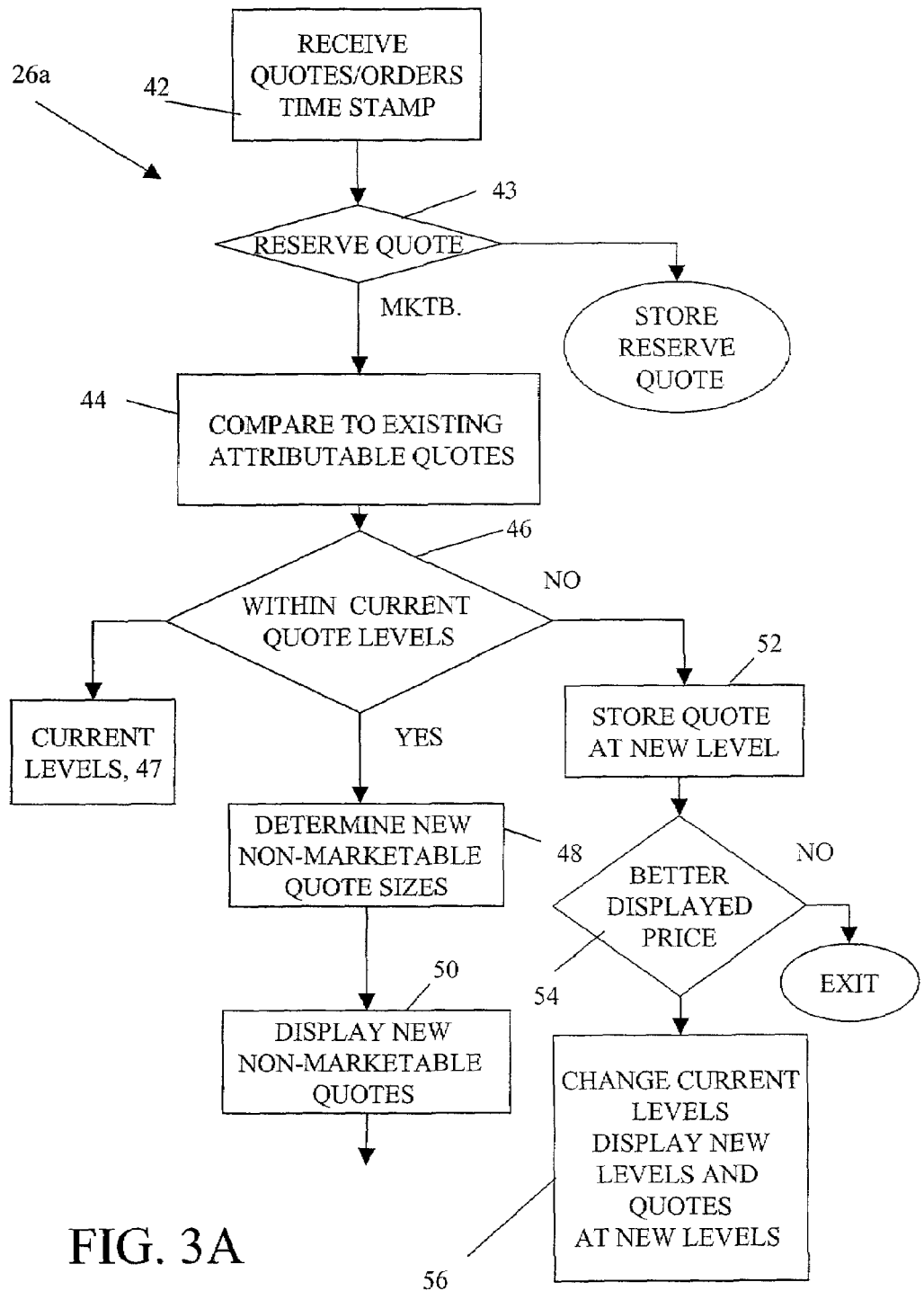
FIG. 3A is a flow chart showing a quote/order manager.

Referring to FIG. 3A, the order collector process 25 receives orders/quotes and time stamps 42 each order/quote upon receipt. This time stamp determines the order's/quote's ranking for automated execution. Quotes/orders are designated as either attributable or non-attributable, and could also have a reserve size discussed above. The order collector process 25 aggregates all of a quoting market participant's attributable and non-attributable orders at a particular price level, and disseminates order/quotation information into the aggregate montage and/or the current quote montage, as will be discussed below.

The order entry process 25 determines 43 whether the received quote/order corresponds to reserve interest. If the quote does not correspond to a reserve quote then the quote is a displayable quote that is attributable or non-attributable. The order entry process 25 compares 44 the received quotes/orders to existing quotes/orders to determine 46 whether the price of quotes/orders fall in existing quote/order price levels. Any number of quote/order price levels can be accommodated e.g., in this example, five price levels will be displayable in the non-attributable i.e., aggregate montage. If the quote price is in a displayable price level it is a displayable quote eligible for automated execution. The order collector system 20 can be provided with more price level depth than the five levels, e.g., a depth of 20-25 levels although only a limited number, e.g., would be displayed at any one time.

If the quote is within one of the pre-defined quote levels, the process 25 determines 48 new non-marketable quote/orders sizes by adding the quote/order size corresponding to the received quote/order to quote sizes at that price level already in the system 20. The process 25 will cause the new non-marketable quote sizes to be displayed 50. If the quote is not within one of the pre-defined quote levels, the process 25 stores 52 the quote at a new price level determines 54 if it is at a better price. If the quote is at a better price, the process 25 changes 56 current levels to cause a new price level w for non-marketable quote sizes to be displayed 50.

Figure 3B:
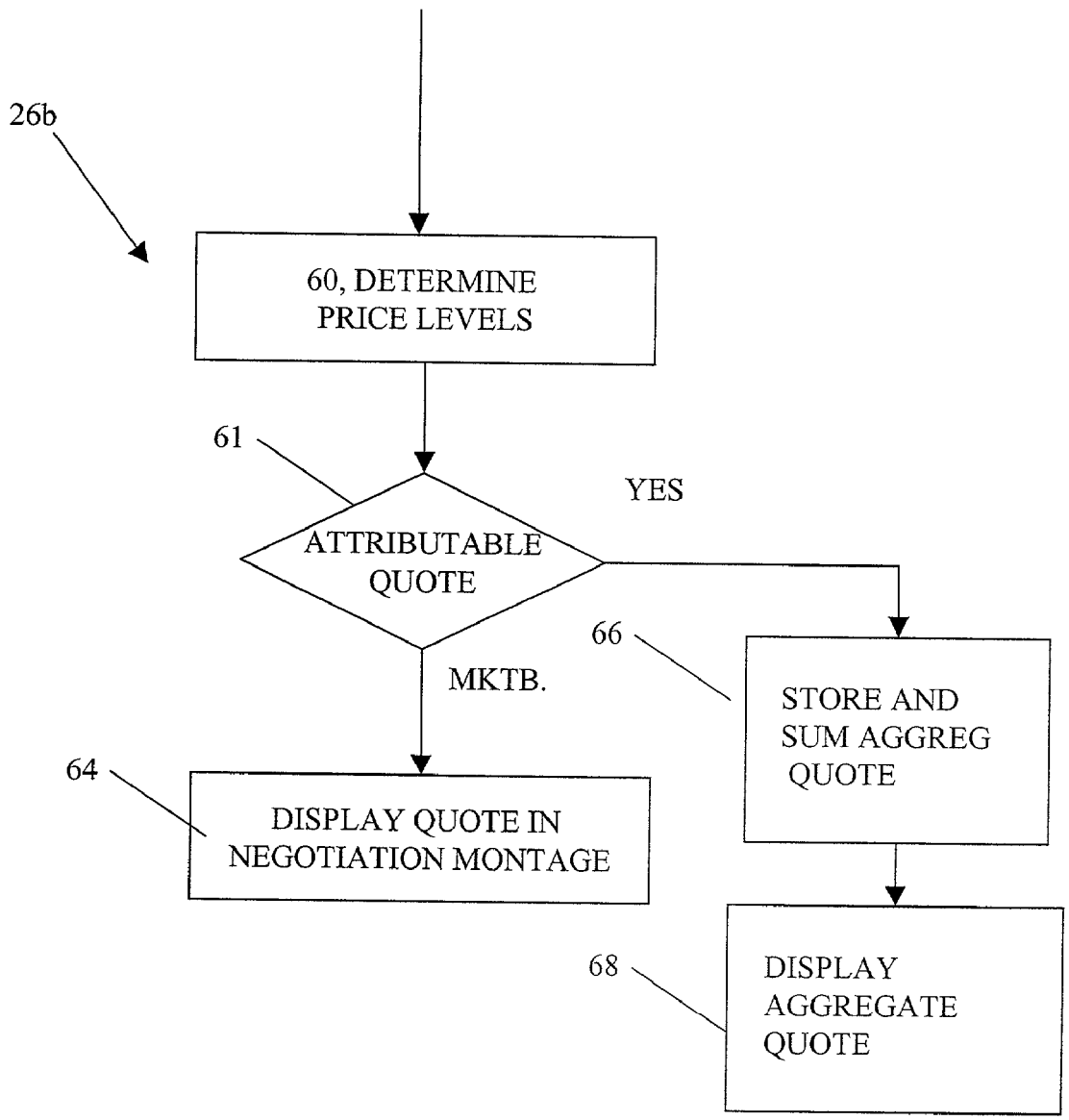
FIG. 3B is a flow chart showing a montage manager.

Referring to FIG. 3B, the montage manager 26b of the quote/order collector process 25 determines 60 which price levels to display and determines 61 if an order is a non-attributable order. If the order is non-attributable, the quote/order collector process 25 will store and sum 66 the quote with like quotes to produce an aggregated quote and display 68 the aggregate size of such orders in the aggregate montage when the orders fall within one of the three top price levels. For attributable orders, the aggregate size of such orders is displayed in the current quote montage once the order(s) at a particular price level becomes the particular quoting market participant's best attributable bid or offer in the current quote montage. This interest will also be aggregated and included in the aggregate montage if it is within the displayed price levels. Market makers and ECNs can have one MMID and possibly an agency MMID against which they can display attributable quotes. If a market maker has an agency quote, attributable orders will be displayed once the order or orders at a particular price level become the market participant's best agency quote.

Quote/order collector system 20 provides several advantages to the market. One advantage is that it ensures compliance with the regulatory rules such as the SEC Order Handling Rules, and in particular the Limit Order Display Rule and SEC Firm Quote Rule. With system 20 it is less likely that a Quoting Market Participant, because of system delays and or/fast moving markets, will miss a market because the Quoting Market Participant is unable to quickly transmit to system 20 a revised quote (which may represent a limit order).

Nondirected Orders

Figure 4:
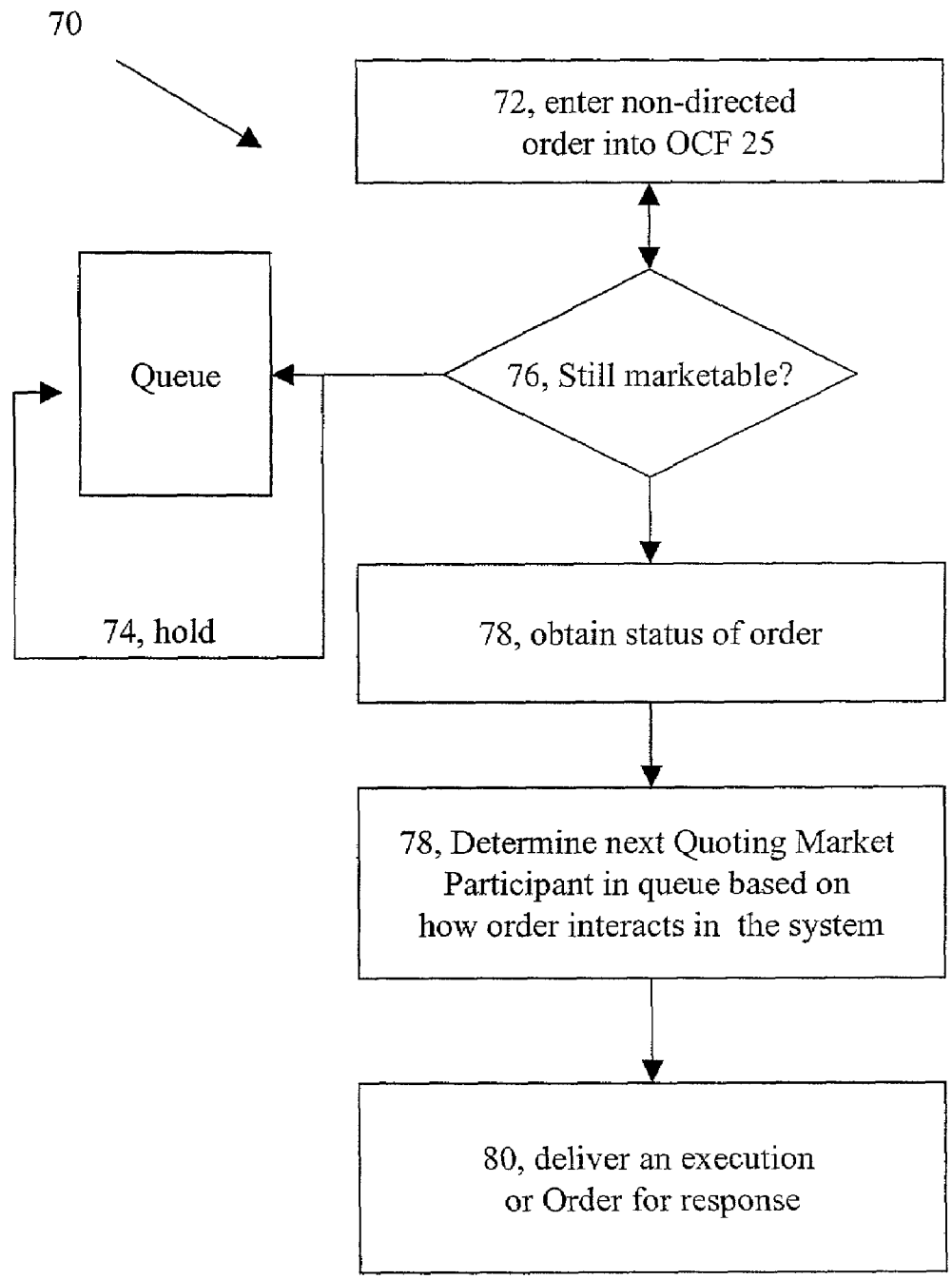
FIG. 4 is a flow chart of an execution/routing manager.

Referring to FIG. 4, the market 10 allows market participants that enter Non-Directed Orders three options as to how the order interacts with the quotes/orders in the system 20. An exemplary format was described above in FIG. 1B. These choices are that the orders can execute against displayed contra side interest in strict price/time; or price/size/time; or price/time that accounts for ECN access fees. This can be set by selecting one of the options on the order entry screen (FIG. 1B). As a default, the system 20 can execute Non-Directed Orders in general price/time priority. A non-directed order is an order that is not executed or routed for response to a particular Quoting Market Participant, e.g., a particular market maker or ECN.

A market participant can immediately access the best prices in system 20, as displayed in the aggregate montage, by entering 72 a non-directed order into the OCF 25. A non-directed order is designated as a market order or a marketable limit order and is considered a "Liability Order" and treated as such by the receiving market participant. If a non-directed limit order is marketable when entered into the system 20 but subsequently becomes non-marketable because of a change in the inside market, the system 20 may hold 74 the order for e.g., 90 seconds and not immediately return the order to the participant. If within the holding period e.g., 90 seconds, the order once again becomes marketable, the system 20 will execute/send the order to the next Quoting Market Participant in the non-directed order queue. Additionally, the order entry participant can obtain 76 the status of the order and request a cancel of such order (not shown). In some embodiments, the hold period can be less or can be eliminated and also can be selectively applied to market participants depending on how they participate in the market.

Upon entry, the OCF 25 will determine 78 what market participant is the next Quoting Market Participant in queue to receive an order, based on how the participant desires to have the order interact in the system 20. Depending on how that receiving Quoting Market Participant participates in system 20 (i.e., automatic execution v. order delivery), the OCF 25 will either execute or will deliver the orders for execution by non-auto-execution participants.

Figure 5:
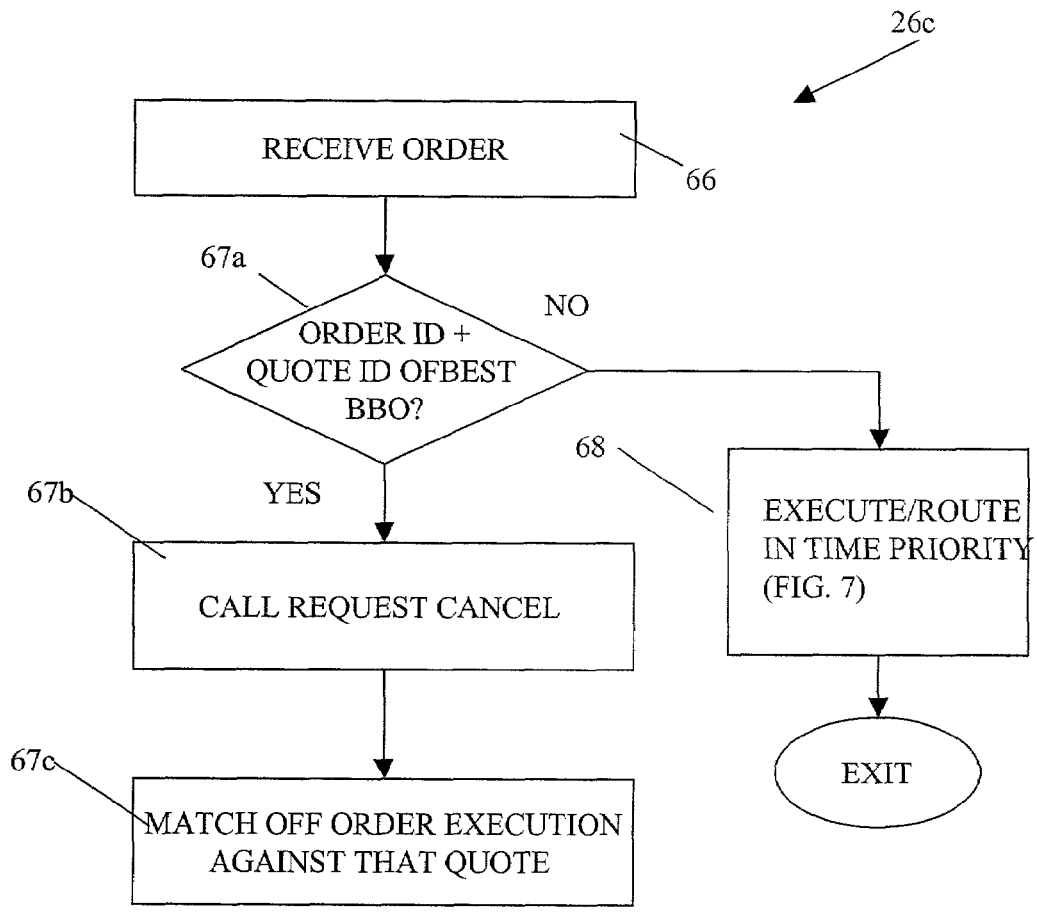
FIG. 5 is a flow chart showing an internal execution manager.

Referring now to FIG. 5, the internalize execution manager 26g is shown. Another benefit of the system 20 is that when Quoting Market Participant is at the best bid/best offer, internalize execution manager 26c matches-off a participant's agency or proprietary orders against that participant's quotes/order before the order is sent for time/price priority execution in the quote/order collector facility 20.

For example, if MMA sends system 20 all of its quotes/orders and is at the best bid of $20 showing 4,000 shares (attributable and non-attributable), and the MMA sends OCF 25 a 1,000 share market sell order from one its customers, OCR 25 will examine 67a the identification of the order and if it matches the identification of the market participant who is at the best bid or offer for that security, the OCP 25 will execute 67b the order against the participant's own quote, thus matching off the order on behalf of the participant. The OCP 25 can call 67c a "request a cancel" function where a Quoting Market Participant can request cancellation of an order from system 20 before the order is actually executed. The request to cancel feature, along with the ability to leave orders with system 20, will benefit ECNs by allowing them to participate in automatic execution and the internalized execution process 67 described above while minimizing the potential for double liability or taking on a proprietary position.

Order Execution Manager

FIGS. 6, and 6A-6D, show processing in the order execution/routing manager 26d. The order execution/routing manager 26d will execute non-directed orders against Quoting Market Participant's quotes/orders based on the chosen priority, e.g., contra side interest in strict price/time; or price/size/time; or price/time that accounts for ECN access fees priority. As noted above, each quote/order when entered into the OCF 25 receives a time stamp. The order execution/routing manager 26d will deliver all orders at the best bid/best offer in chosen priority.

The order execution/routing manager 26d receives 82 an order and examines 84 the value of field 17i (FIG. 1B) of the order to check if the market participant had specified the anti-internalization qualifier property for the order. If the anti-internalization qualifier property is set the order execution manager will by-pass calling the internalize execution manager 26c and instead will execute the order according to a specified priority, if any. If the anti-internalization qualifier property is not set the order execution manager will call 86 the internalize execution manager 26c.

The internalize execution manager 26c (FIG. 5) attempts to match off of orders/quotes entered by a Quoting Market Participant, if the Quoting Market Participant is at the BBO and receives a market or marketable limit order on the other side of the market. If the internalize execution manager 26c cannot match off the order or if the anti-internalization property was set for the order, then the order will be matched off based on a priority.

The system 20 has a default, e.g., a strict price/time priority. If a market participant does not override the default or selects price/time 94, (FIG. 6A) a Non-Directed Order would be executed 96 first against all displayed quotes/order of market makers, ECNs, and non-attributable agency orders of UTP Exchanges, in time priority between such interest. If the order is not satisfied 98 at that level of priority the order will execute 100 against the reserve size of market makers and ECNs in time priority between such interest. If the order still is not satisfied 102, (FIG. 6B) the order will execute 104 against principal quotes of UTP Exchanges, in time priority between such interest.

Alternatively, a market participant can indicate that the orders execute against contra side interest on a price/size/time basis. A Non-Directed Order would execute 106 (FIG. 6A) against displayed quotes and then reserve size based on the size of the displayed quote, and then time if there is a tie in size. Reserve size is executed against based on the size of the related displayed quote/order, not the total amount held in reserve. Under this option, orders are processed first against displayed quotes/orders of market makers, ECNs, and agency quotes/orders of UTP Exchanges in price/size/time priority between such interest. If the order is not satisfied 108 (FIG. 6B) at that level of priority the order will execute 110 against reserve size of market makers and ECNs, in price/size/time priority of such interest, with size priority based on the size of the related displayed quote/order. If the order is still not satisfied 112 (FIG. 6C) at that level of priority the order will execute 114 against principal quotes of UTP Exchanges, in price/size/time priority between such interest.

A third choice enables a market participant to indicate that their order should be executed in a manner that accounts for ECNs quote-access fees. If a market participant selects this option 116, (FIG. 6A) Non-Directed Orders execute 118 (FIG. 6A) first against displayed quotes/orders of market makers, ECNs that do not charge a separate quote-access fee, and non-attributable agency orders of UTP Exchanges. The order can also execute against the quotes/orders of ECNs that charge a separate quote-access fee where the ECN indicates that price improvement offered by the quote/order is equal to or exceeds the quote-access fee. The execution is in time priority between such interest.

If the order is not satisfied 120 (FIG. 6B) at that level of priority the order will execute 122 against displayed quotes/orders of ECNs that charge a separate quote-access fee to non-subscribers. If the order is not satisfied at that level of priority the order will execute against reserve size of market makers and ECNs that do not charge a separate quote-access fee to non-subscribers, as well as reserve size of quotes/orders from ECNs that charge a separate quote-access fee to non-subscribers where the ECN entering such quote/order has indicated that the price improvement offered is equal to or exceeds the quote-access fee. Execution is in time priority between such interest. If the order is not satisfied 124 (FIG. 6C) at that level of priority the order will execute 126 against the reserve size of ECNs that charge a separate quote-access fee to non-subscriber, in time priority between such interest. If the order is not satisfied 128 at that level of priority the order will execute 130 against principal interest of UTP Exchanges, in time priority between such interest.

With all three approaches, the market 10 would make an exception for Non-Directed Orders entered by a market participant when that market participant is also at the inside market, depending on the value of the anti-internalization qualifier field 17i (FIG. 1B) for the order, as described above. Additionally, there can be an exception for "Preferenced Orders" as described below, if preferenced orders are supported in the system.

The Non-Directed Order Processing takes into consideration that factors other than cost or access fees may be important to market participants in making investment decisions. The system 20 gives market participants the choice to determine how best to execute their customer or proprietary orders. The execution algorithm/logic for Non-Directed Orders provides a flexible approach allowing market participants choices of how best to interact with the market. This processing is an attempt to address best execution concerns while being flexible to meet participant's needs without imposing a needlessly rigid structure similar to a central limit order book ("CLOB"). Additionally, a strict price/time priority (without choice) would force the public investor to pay ECN quote access fees, thus squashing competition.

Figure 6:
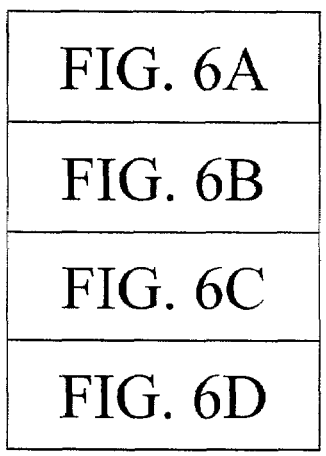
FIG. 6 depicts the arrangement of FIGS. 6A-6D.
Figure 6A:
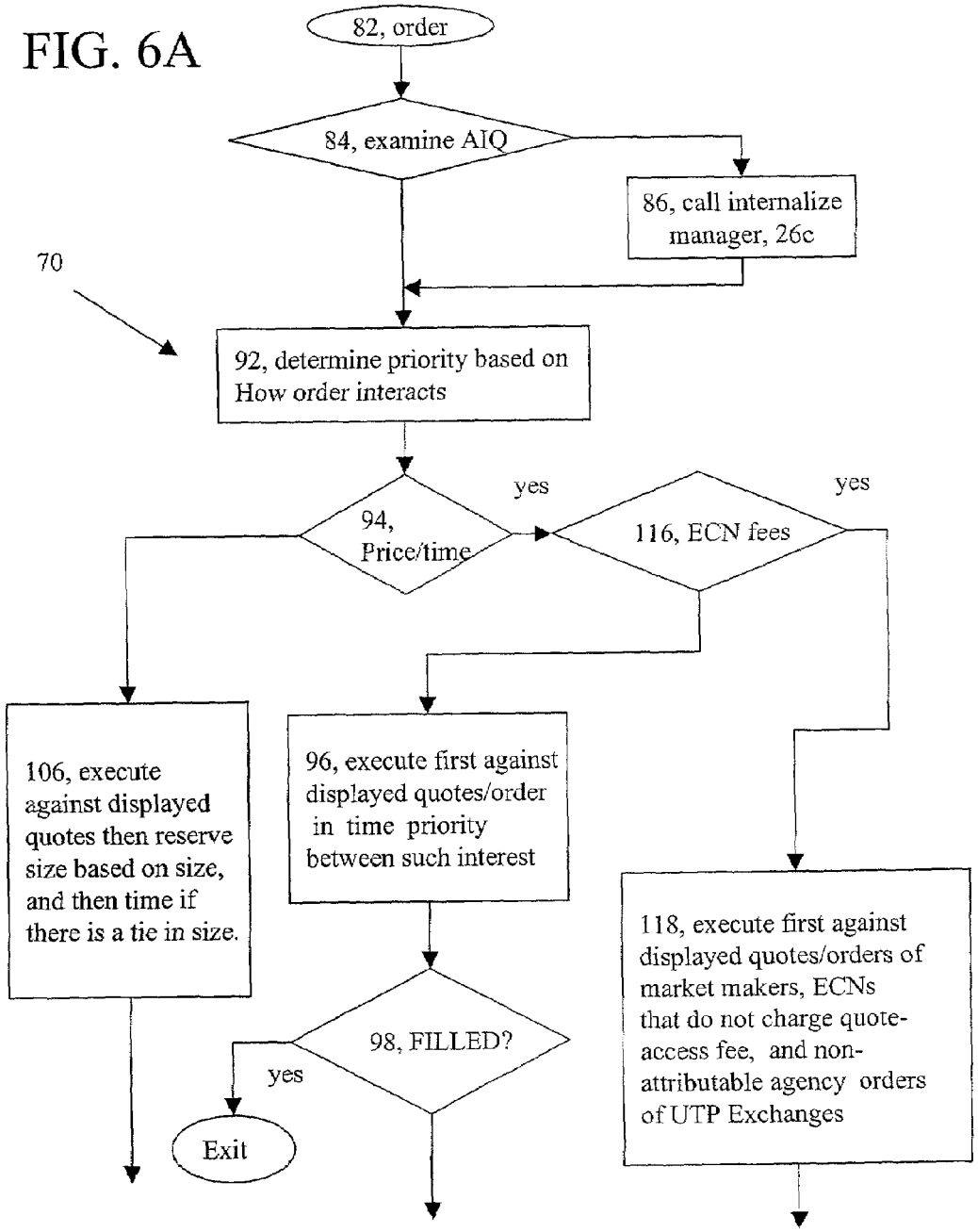
FIGS. 6A-6D are flow charts depicting details of the execution/routing process.
Figure 6B:
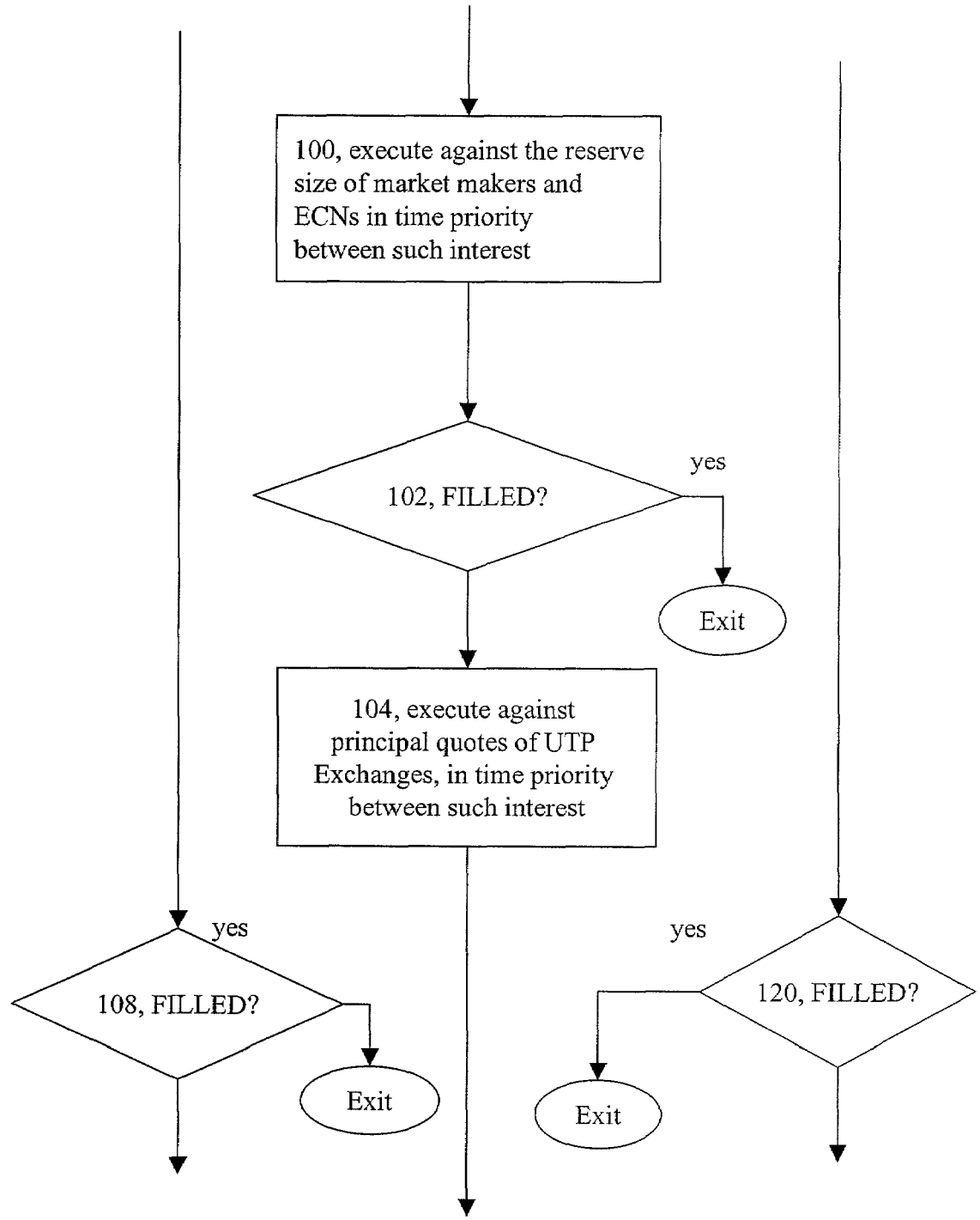
Figure 6C:
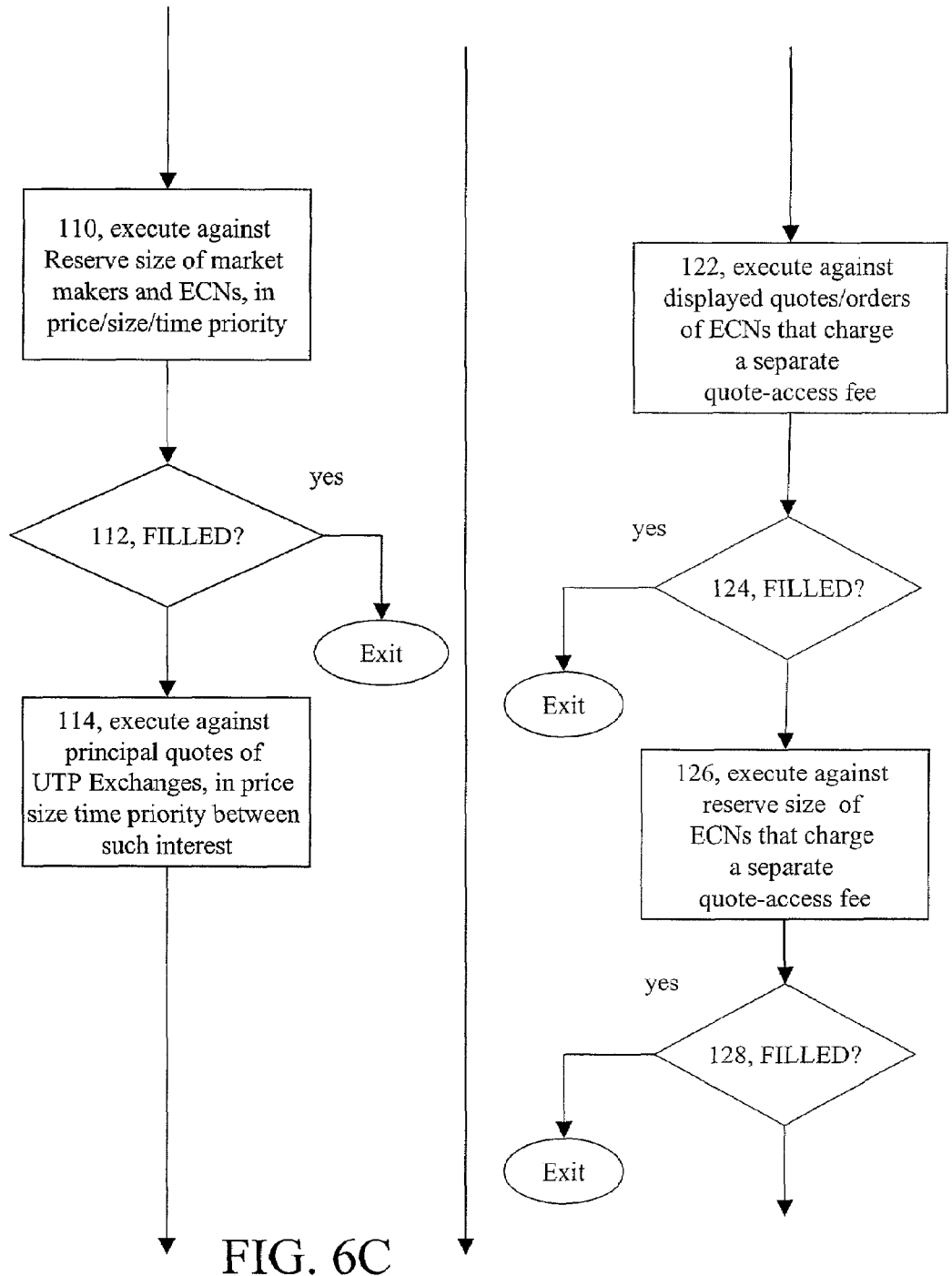
Figure 6D:
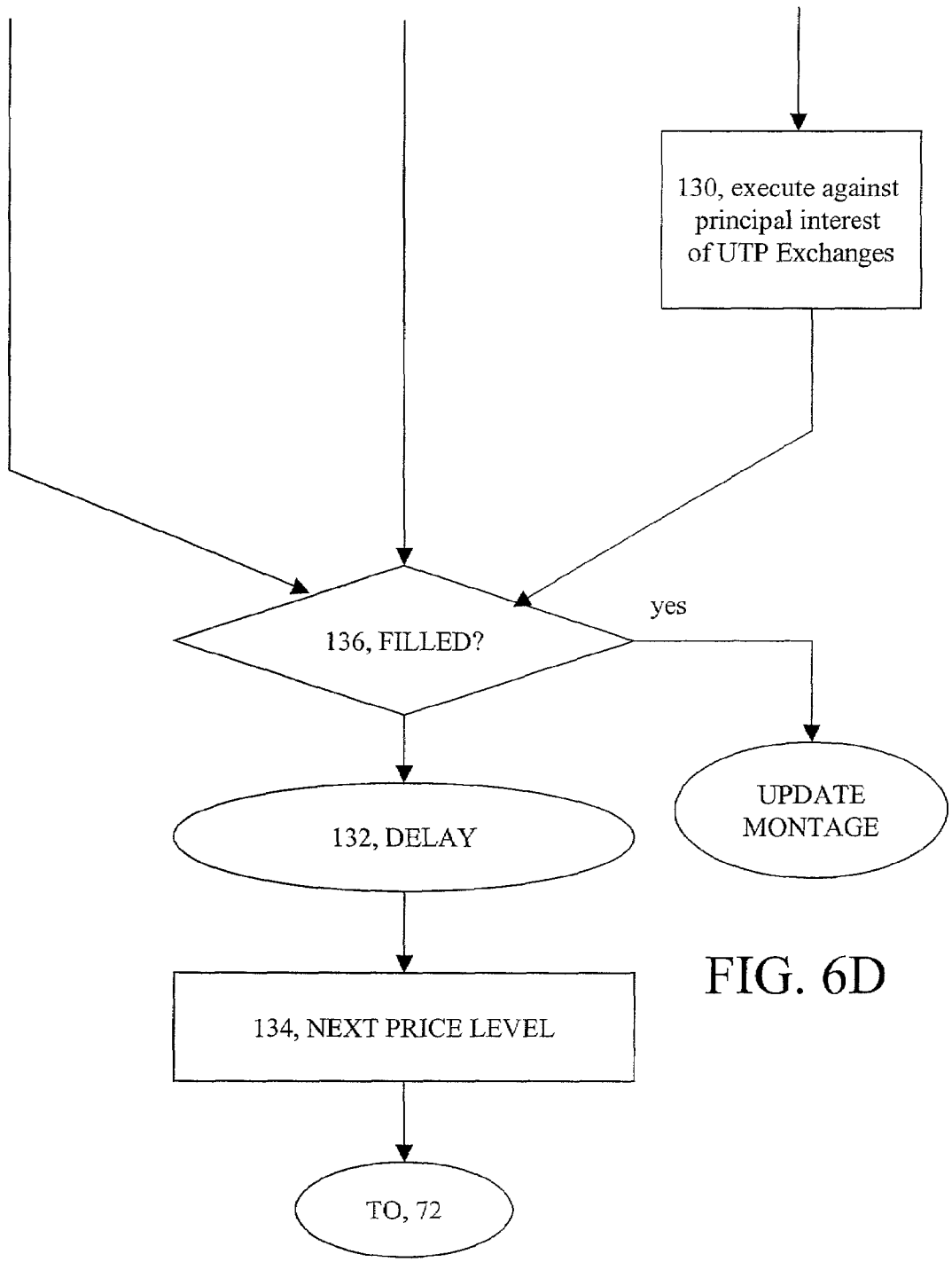

Referring to FIG. 6D, if the order is not filled 136, the order execution/routing manager 26d will move 134 to the next price level, after a predefined delay, e.g., 5 seconds or so interval delay 132 before attempting to execute an order at the new price level. In some embodiments, there would not be any predefined delay. The price-level interval delay will give market participants time to adjust their quotes and trading interests before the market moves precipitously through multiple price levels, which may occur when there is news, rumors, or significant market events. Thus, the price-level interval delay is a modest and reasonable attempt to limit volatility. In some embodiments this delay can be eliminated.

Preferenced Orders

Figure 7A:
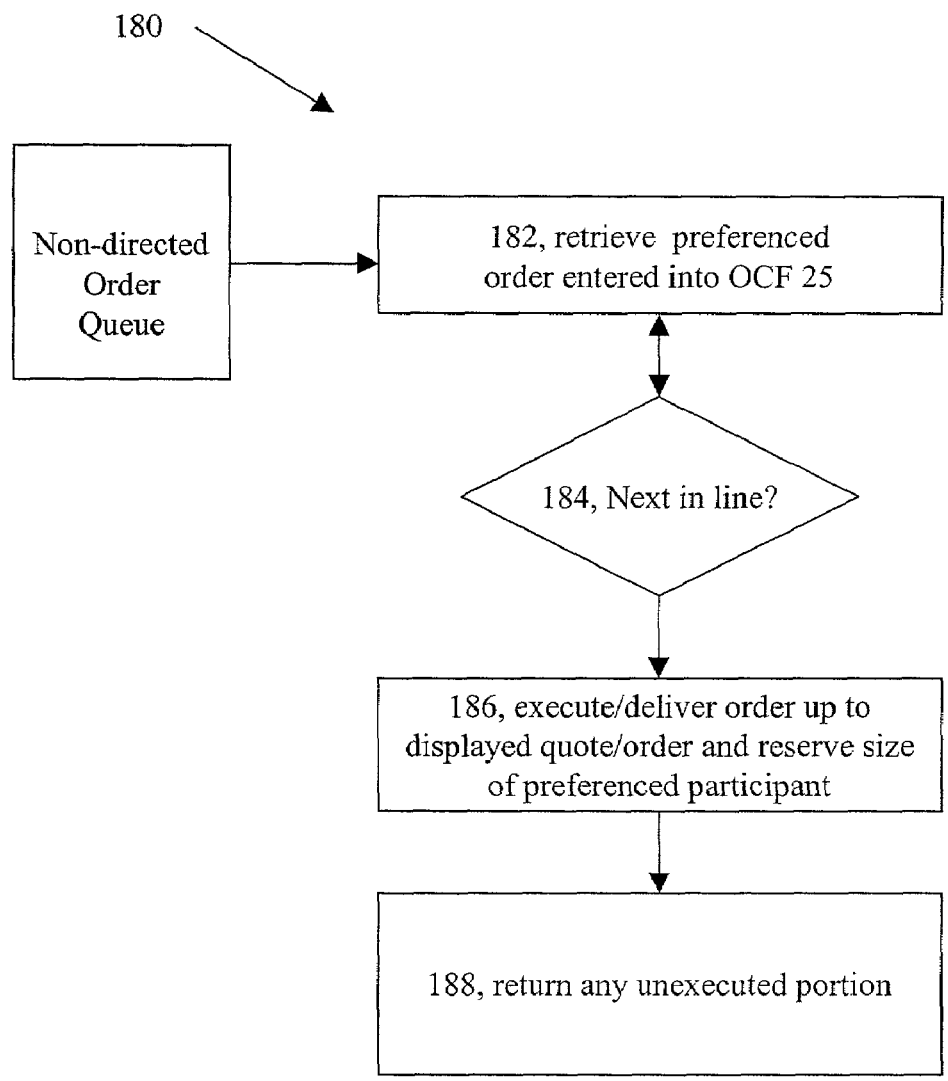
FIGS. 7A-7B are flow charts depicting preferenced order processing.

Referring to FIG. 7A, processing 180 for a class of orders referred to as "Preferenced Orders" is shown. A preferenced order is an order that is preference to a particular quoting market participant e.g., market maker or ECN. Preferenced Orders can be of two types. Preferenced Orders of either type are entered into the system 20 through the Non-Directed Order Process. The market participant entering the Preferenced Order designates the quoting market participant by its identification symbol ("MMID"). Preferenced Orders are processed in the same "queue" as Non-Directed Orders.

The Preference Order is considered a liability order. As with Non-Directed Orders, a Preferenced Order will be delivered as an order to a market participant that does not participate in the automatic execution functionality of the system 20, or will be delivered as an execution against the preferenced market maker, as well as market participants that choose to accept auto-execution.

The process 180 retrieves 182 preferenced orders from the Non-Directed Order queue and determines 184 when a Preferenced Order is next in line to be executed from the Non-Directed Order queue. The process 180 will execute 186 against (or will deliver an order in an amount up to or equal to) both the displayed quote/order and reserve size of the quoting market participant to which the order is being preferenced ("preferenced quoting market participant"). Any unexecuted portion may be returned 188 to the entering market participant.

Figure 7B:
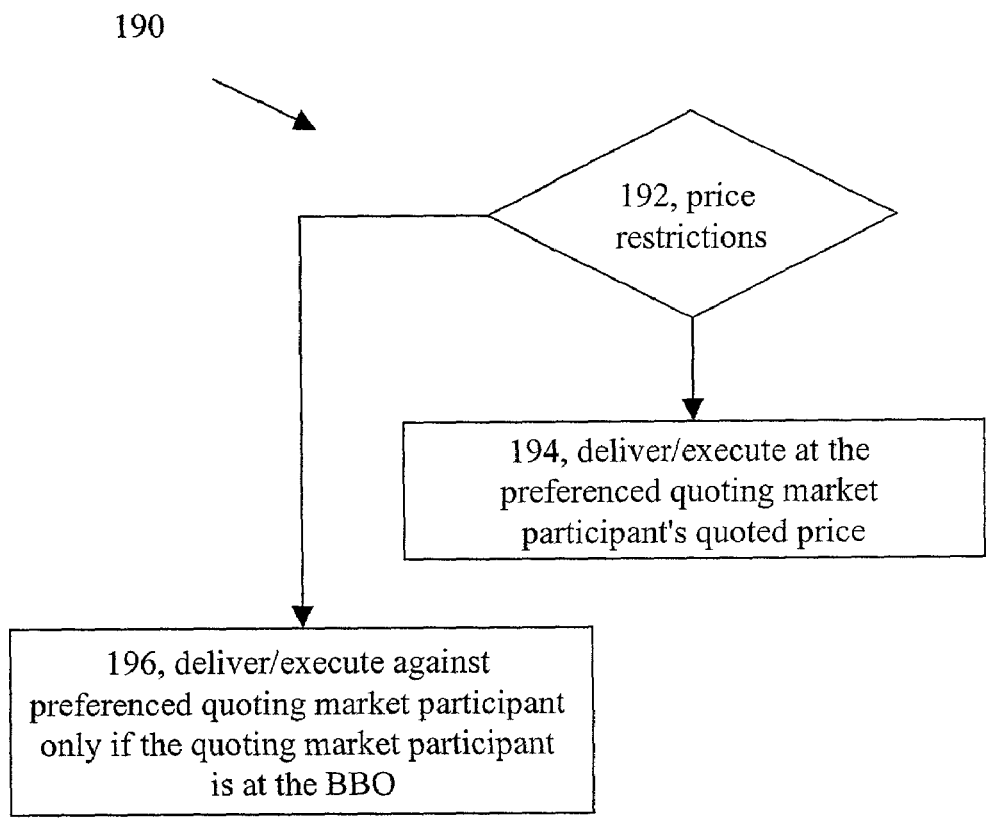

Referring to FIG. 7B, processing 190 of preferenced orders is shown. One type of Preferenced orders is a Preferenced Order with "No Price Restrictions" and another type is a Preferenced Order with "Price Restrictions." In some embodiments the system 20 could include both types while in other embodiments, the system 20 would include one but not the other type. If the embodiment included only one type then the processing described here would be somewhat different. For an embodiment having both types, the processing 190 determines 192 if there are price restrictions.

For Preferenced Orders with No Price Restrictions 194 the next in-line Preferenced Order will be executed (or delivered for execution) at the preferenced quoting market participant's price, regardless of whether the quoting market participant is at the best bid/best offer ("BBO"). The execution will occur at the preferenced quoting market participant's quoted price. Thus, under this approach, Preferenced Orders may be executed at the BBO or outside the BBO.

The purpose of this type of Preferenced Order is to maintain functionality similar to that which currently exists in Nasdaq. That is, today market participants often use the SelectNet service to send orders to market makers or ECNs who are quoting at the BBO or away from the BBO. Market participants sometimes attempt to "sweep the street" or access liquidity at or near the inside market. A market maker that is "working" an institutional order may also send a SelectNet message to a market maker or ECNs who is quoting away from the inside. This may occur if the market maker believes the market participant has greater size to offer, and thus will result in a more efficient execution for the institutional customer. This functionality does not obviate best execution obligations.

With Preferenced Orders with Price Restrictions 196 there will be price restrictions that accompany the Preferenced Orders. That is, when a Preferenced Order is next in line to be executed from the Non-Directed Order queue, the Preferenced Order will be executed (or delivered for execution) against the preferenced quoting market participant to which the order is being directed only if the quoting market participant is at the BBO (up to the displayed and reserve size). If the quoting market participant to which the order is being directed is not at the BBO when the Preferenced Order is next in line to be delivered or executed, the Preferenced Order will be returned to the entering participant. Thus, under this approach, Preferenced Orders only will be executed at the BBO, and only if the preferenced quoting market participant is quoting at the BBO at the time of order delivery (or execution).

Directed Orders

The market can include another type of order, a "directed order." The current quote montage allows Quoting Market Participants to advertise their buying or selling interest. Directed Order processing in could occur in a separate system and allow ECNS and market makers to elect to receive liability orders against their quotes. A market maker or ECN could choose to receive a Directed Order that is also a liability order, or could also choose to accept only non-liability Directed Orders. The market maker or ECN designates that it desires to receive directed order as liability or non-liability, i.e., negotiation orders. Each market participant can inform the market on how it desires to receive directed orders. In some embodiments this can be across all stocks traded by the market participant whereas in other embodiments it could be on a stock by stock basis.

Other Embodiments

Other embodiments are within the scope of the following claims.

What is claimed is:

1. A computer implemented method of processing an order in an electronic-based trading system, the method comprises:
   receiving an order to buy or sell a product, the order having a market participant identification and an indicator for whether an order is qualified to avoid internalization execution; for the order,
   determining by a computer if a market participant has qualified the order for avoidance of an internalization execution for the order in the electronic-based trading system, where internalization execution corresponds to execution of an order if the market participant identification associated the order matches a market participant identification representing a quote in the system that is at the best bid or best offer price in the system regardless of the priority of that quote in the system; and
   executing the order according to whether or not the market participant has qualified the order for avoidance of internalization execution.

2. The method of claim 1 wherein if the market participant has not qualified the order for avoidance of an internalization execution, the method further comprises:
   checking if a market participant identification associated with the order matches a market participant identification representing a quote in the electronic-based trading system which is at the best bid or best offer price in the electronic-based trading system; and if there is a match,
   matching-off the order against the quote of the matching market participant without regard to a priority of other quotes in the electronic-based trading system, against the one of the best bid or best offer that is at the opposite side of a market for a product specified by the order.

3. The method of claim 2, wherein the priority is price-time and the method further comprises:
   matching-off the order without regard to a time priority of other quotes in the electronic-based trading system.

4. The method of claim 2 further comprising:
   calling a cancel request to cancel a quote at the side of the market in which a matched off order will be executed.

5. The method of claim 2 further comprising:
   calling a cancel request prior to matching off the order to cancel a quote at the side of the market at which an matched off order will be executed.

6. The method of claim 1 wherein if the market participant has qualified the order for avoidance of an internalization execution, the method further comprises:
   matching the order to a order of a market participant that has the one of the best bid or best offer that is at the opposite side of a market for the product.

7. The method of claim 6 wherein matching the order occurs based on a priority specified by the order.

8. A networked computer system for providing an electronic-based market system comprises:
   one or more networked computers configured to
   receive orders and match orders against quotes posted in the system on a time priority basis with the orders having a market participant identification and an indicator to avoid internalization execution;
   check if a market participant identification associated with a received order matches a market participant identification representing a quote in the system that is at the best bid or best offer price in the system; and
   check if the market participant has qualified the order for avoidance of the internalization execution for the order in the market system where internalization execution corresponds to execution of an order where the market participant identification associated the order matches a market participant identification representing a quote in the system that is at the best bid or best offer price in the system regardless of the priority of that quote in the system; and
   match the order with quotes in the system according to whether the order is qualified for avoidance of the internalization execution.

9. The system of claim 8 wherein, the one or more computers are further configured, if the market participant has not qualified the order for avoidance of an internalization execution, to
   check if a market participant identification associated with the order matches a market participant identification representing a quote in the system which is at the best bid or best offer price in the system; and if there is a match,
   match the order against the quote of the matching market participant without regard to a priority of other quotes in the system, against the one of the best bid or best offer that is at the opposite side of a market for a product specified by the order.

10. The system of claim 9 wherein the system calls a cancel request prior to matching off the order to cancel a quote at the side of the market at which an matched off order will be executed.

11. The system of claim 8 wherein the system calls a cancel request to cancel a quote at the side of the market in which a matched off order will be executed.

12. The system of claim 8 wherein if the market participant has qualified the order for avoidance of an internalization execution, the system matches the order to an order of a market participant that has the one of the best bid or best offer that is at the opposite side of the market.

13. The system of claim 12 wherein the system matches the order based on a priority specified by the order.

14. The computer program product of claim 12 wherein the instructions cause the computer to match the order based on a priority specified by the order.

15. A computer program product residing on a computer readable medium for operating an electronic based trading system comprises instructions for causing a computer to:
   receive an order from a market participant's customer, the order having a market participant identification and an indicator to avoid internalization execution; and for the order,
   check if the market participant has qualified the order for avoidance of an internalization execution in the electronic based trading system where internalization execution corresponds to execution of an order if the market participant identification associated the order matches a market participant identification representing a quote in the system that is at the best bid or best offer price in the system regardless of the priority of that quote in the system;
   match the order according to whether or not the market participant has qualified the order for avoidance of internalization execution.

16. The computer program of claim 15 further comprises instructions to:
   check if the market participant identification associated with the order matches a market participant identification representing a quote in the system which is at the best bid or best offer price in the system, if a market participant has not qualified the order for avoidance of an internalization execution; and if there is a match,
   match-off the order against the quote of the matching market participant without regard to a priority of other quotes in the system, against the one of the best bid or best offer that is at the opposite side of a market for a product specified by the order.

17. The computer program product of claim 15 further comprises instructions to:
   match the order to a order of a market participant that has the one of the best bid or best offer that is at the opposite side of the market if the market participant has qualified the order for avoidance of an internalization execution.

* * * * *